United States Patent
Hallundbæk (10) Patent No.: US 11,667,339 B2
(45) Date of Patent: Jun. 6, 2023

(54) ELECTRIC BUS WITH SEATS OVER DRIVING WHEELS

(71) Applicant: Alpha EC Industries 2018 S.à.r.l., Luxembourg (LU)

(72) Inventor: Jørgen Hallundbæk, Luxembourg (LU)

(73) Assignee: ALPHA EC INDUSTRIES 2018 S.À.R.L., Luxembourg (LU)

( * ) Notice: Subject to any disclaimer, the term of this patent is extended or adjusted under 35 U.S.C. 154(b) by 753 days.

(21) Appl. No.: 16/593,527

(22) Filed: Oct. 4, 2019

(65) Prior Publication Data
US 2020/0108878 A1 Apr. 9, 2020

(30) Foreign Application Priority Data
Oct. 5, 2018 (LU) .................................. LU100956

(51) Int. Cl.
*B62D 47/02* (2006.01)
*B60D 5/00* (2006.01)
*B60K 1/02* (2006.01)
*B60K 1/04* (2019.01)

(52) U.S. Cl.
CPC ........... *B62D 47/025* (2013.01); *B60D 5/003* (2013.01); *B60K 1/02* (2013.01); *B60K 1/04* (2013.01); *B60K 2001/0438* (2013.01); *B60L 2200/18* (2013.01)

(58) Field of Classification Search
CPC ...... B62D 47/02; B62D 47/025; B62D 31/02; B62D 31/025; B60L 2200/18
See application file for complete search history.

(56) References Cited

U.S. PATENT DOCUMENTS

| | | | | |
|---|---|---|---|---|
| 3,559,342 A | * | 2/1971 | Sherbert et al. | B62D 31/02 49/395 |
| 5,813,487 A | * | 9/1998 | Lee | B62D 7/159 180/65.245 |
| 9,315,093 B2 | * | 4/2016 | Lee | B60L 58/21 |
| 9,630,502 B2 | * | 4/2017 | Chen | B60L 3/0069 |
| 9,889,742 B2 | * | 2/2018 | Chen | B60L 1/003 |

(Continued)

FOREIGN PATENT DOCUMENTS

| CN | 203318128 U | 12/2013 |
|---|---|---|
| CN | 203832595 U | 9/2014 |

(Continued)

OTHER PUBLICATIONS

Luxembourg Search Report with Written Opinion dated Jun. 28, 2019, 8 pages.

*Primary Examiner* — Jeffrey J Restifo
(74) *Attorney, Agent, or Firm* — Rankin, Hill & Clark LLP (57) ABSTRACT

An articulated electric bus includes two units with: a passenger compartment including a main floor forming a low and thin platform with a planar surface extending over the majority of the width of the passenger compartment, a wheel housing adjacent to the planar surface, a longitudinal row of seat places on the wheel housing, and a driving wheel which is housed in the wheel housing under the longitudinal row of seats. The driving wheel defines a rotation axis and includes an electric engine, and a rim with a rim top above the planar surface. The driving wheel is vertically movable with respect to the planar surface, and the wheel housing actually receives a pair or a couple of driving wheels.

19 Claims, 4 Drawing Sheets

(56) References Cited

U.S. PATENT DOCUMENTS

| | | | |
|---|---|---|---|
| 2009/0224570 A1* | 9/2009 | Haswell | B62D 31/04 296/178 |
| 2013/0000997 A1* | 1/2013 | Peng | B60L 58/26 180/65.6 |
| 2015/0165885 A1* | 6/2015 | Lee | B60L 50/66 180/68.5 |
| 2016/0090134 A1* | 3/2016 | Niu | B60K 1/04 180/22 |
| 2017/0174269 A1* | 6/2017 | Farhadi | B62D 47/02 |
| 2017/0240214 A1* | 8/2017 | Pelletier | A61G 3/062 |
| 2020/0060903 A1* | 2/2020 | Shiga | B60N 2/3043 |
| 2020/0062097 A1* | 2/2020 | Hara | B60L 50/66 |
| 2020/0108740 A1* | 4/2020 | Hallundbæk | B62D 31/02 |
| 2020/0108878 A1* | 4/2020 | Hallundbæk | B60K 1/04 |
| 2020/0114796 A1* | 4/2020 | Hallundbæk | B62D 47/02 |
| 2020/0239064 A1* | 7/2020 | Hallundbæk | B60G 3/20 |
| 2020/0239068 A1* | 7/2020 | Hallundbæk | B62D 7/18 |
| 2020/0282783 A1* | 9/2020 | Hallundbæk | B62D 25/16 |
| 2020/0298694 A1* | 9/2020 | Hallundbæk | B60K 7/0007 |

FOREIGN PATENT DOCUMENTS

| | | |
|---|---|---|
| EP | 2055615 A1 | 5/2009 |
| EP | 2933172 A1 | 10/2015 |
| FR | 1142785 A | 9/1957 |
| FR | 2787082 A3 | 6/2000 |
| GB | 2344801 A | 6/2000 |
| JP | 2005289252 A | 10/2005 |
| WO | 96/07558 A1 | 3/1996 |
| WO | 2013/000385 A1 | 1/2013 |

* cited by examiner

ELECTRIC BUS WITH SEATS OVER DRIVING WHEELS

TECHNICAL FIELD

The invention stands in the field of electric bus. More precisely, the invention provides a passenger compartment architecture for an electric bus. The invention provides safety solutions adapted for an electric, notably with regard to side collision.

BACKGROUND OF THE INVENTION

An electric bus combines a passenger compartment with longitudinal seat rows, and wheel housings protruding within the passenger compartment. Arranging the longitudinal seat rows alongside side walls permits to keep a wide platform for standing passengers therebetween. Consequently, this arrangement increases the overall passenger capacity of the electric bus, notably of its tractor and of its there attached trailers.

In order to promote the autonomy by means of an energy consumption reduction, the weight and the overall dimensions of the electric bus are reduced. However, keeping a high passenger capacity generally requires to increase the weight and the overall dimensions. As it may be deduced from the above, conceiving an electric bus involves compromises. In turn, these compromises generally impact the cost of driven kilometre pro passenger.

The passenger safety remains a main concern. Indeed, circulation in cities exposes electric busses to accidents with other vehicles. At crossroads, an electric bus may face a side collision wherein another vehicle strikes one of its side walls. Since the seated passengers occupying the longitudinal seat rows are directly behind this side wall, they are directly exposed to injuries. The passengers are even more exposed when the electric bus is doted of a low platform. Thus, a safety solution is required.

The document CN 203 832 595 U discloses a bus with a passenger compartment and wheel housings protruding in the passenger compartment. The passenger compartment encloses a longitudinal seat row longitudinally beside the wheel housing. The floor of the bus exhibits elevated portions which are adjacent to transversal seats on top of the wheel housings.

The document US 2016/090134 A1 discloses an articulated bus comprising several longitudinal seat rows, and different battery packs. The rear unit of the articulated bus exhibits a height variation, with an elevated area under which several batteries are installed and receiving two longitudinal seat rows.

TECHNICAL PROBLEM TO BE SOLVED

It is an objective of the invention to present an electric bus, which overcomes at least some of the disadvantages of the prior art. In particular, the invention also has for technical problem to increase the safety of an electric bus, notably with regard to side collision. Optionally, the invention considers improving the compactness of an electric bus.

SUMMARY OF THE INVENTION

According to a first aspect of the invention it is provided an electric bus for at least forty passengers, notably an articulated electric bus, said electric bus including a unit with:

a wheel housing,
a passenger compartment comprising a main floor with a planar surface extending, notably transversally, over the majority of the width of the passenger compartment, notably along the wheel housing, possibly along the whole longitudinal length of the wheel housing,
a longitudinal row of seat places on the wheel housing, and
a driving wheel which is housed in the wheel housing under the longitudinal row of seat places and which includes: an electric engine, a rotation axis, a rim with a rim top above the planar surface.

Preferably, the driving wheel includes a hub to which the rim is fixed, said hub including a hub top above the planar surface.

Preferably, the driving wheel is movable vertically with respect to the planar surface between an upper position, notably a boarding position, where the rotation axis of the driving wheel is above the planar surface; and a lower position, notably a driving position, wherein the rotation axis of the driving wheel is under the planar surface.

Preferably, the main floor is formed by a low platform which includes a bottom surface, the rotation axis being above said bottom surface, notably in the lower position and/or in the upper position.

Preferably, the main floor is formed by a platform with a vertical thickness, notably an overall vertical thickness, smaller than the width of the driving wheel.

Preferably, the driving wheel includes a tire with a side flange exhibiting a radial height of at most the half of the transversal width of the driving wheel.

Preferably, the seat places of the longitudinal row extend transversally over the whole transversal width of the driving wheel, and notably the transversal width of the wheel housing.

Preferably, the wheel housing extends longitudinally along at least at least two or at least three seat places of the longitudinal row.

Preferably, the electric bus includes a longitudinal central axis, the backrests of the seat places facing transversally said longitudinal central axis.

Preferably, the longitudinal row of seat places is a longitudinal bench, and/or the longitudinal row includes at least three seat places, preferably at least six seat places.

Preferably, the electric bus includes a ground clearance which represent at least the half of the radius of the driving wheel, notably in the lower position and/or in the upper position.

Preferably, the wheel housing includes a main beam extending along the whole length of the longitudinal row of seat places, and a reinforcement beam which is vertically or transversally level with the main beam; the wheel housing extending along the whole length of said reinforcement beam.

Preferably, the driving wheel is a first wheel, the unit including a second wheel which is longitudinally spaced from the first wheel and which is housed in the wheel housing, notably under the longitudinal row of seat places.

Preferably, a longitudinal gap between the first wheel and the second wheel is smaller than the transversal width of the first wheel and/or than the radius of said first wheel.

Preferably, the longitudinal row is a first longitudinal row, the unit includes a second longitudinal row of seat places, all the longitudinal rows of the unit are at the same vertical level.

Preferably, the driving wheel includes a suspension system below the longitudinal row and vertically level with the planar surface of the main floor.

Preferably, the wheel housing is a first housing, the unit further including a second housing symmetric to the first housing, the planar surface extending from the first housing to the second housing.

Preferably, the longitudinal row is a first longitudinal row, the unit further including a second longitudinal row of seat places which is symmetric to the first longitudinal row, the planar surface extending transversally from the first longitudinal row to the second longitudinal row.

Preferably, the longitudinal row is a first longitudinal row, the unit further including a third longitudinal row of seat places which is colinear with the first longitudinal row.

Preferably, the unit is a first unit, the electric bus including at least a second unit identical or similar to the first unit, the first unit and the second unit being joined to each other by a hinged junction, the electric bus having a passenger capacity of at least one hundred passengers.

Preferably, in the upper position, a vertical majority of the driving wheel is disposed vertically between the longitudinal row and the planar surface.

Preferably, the planar surface comprises a longitudinal section extending along the whole wheel housing and extending along the majority of the width of the bus, and/or the unit.

Preferably, the planar surface extends longitudinally along all the seat places of the row.

Preferably, the electric engine is at least partially or mainly enclosed in the wheel housing.

Preferably, the electric bus, notably the unit, is adapted for at least fifty passengers, or at least one hundred passengers.

Preferably, the electric bus includes at least twenty, or forty seat places. Each seat place may be understood as a seat.

Preferably, the main floor is formed by a platform with a vertical thickness representing at most 20% of the diameter of the wheel, or at most the half of the radius of the driving wheel.

Preferably, the thickness of the platform is smaller than the distance, and/or the vertical displacement, between the upper position and the lower position.

Preferably, the wheel housing is contiguous to the planar surface, and notably protrudes from the planar surface.

Preferably, all the seats, respectively the seat places, of the unit are at the same vertical level.

Preferably, the planar surface extends along the majority or the whole length of the unit.

Preferably, the seats are transversal seats with a seat place facing transversally inwards.

Preferably, each seat includes a transversal width which is greater than the radius of the driving wheel.

Preferably, the transversal width of the planar surface is larger than the diameter of the driving wheel.

Preferably, the planar surface extends transversally over the majority of the unit, and/or extends over the majority of the area of the unit.

Preferably, the or each unit is a stiff unit.

Preferably, the wheel housing is longitudinally level with the planar surface.

Preferably, the platform includes an upper half, the rotation axis being disposed vertically level with said upper half, notably in the lower position.

Preferably, the wheel housing forms a recess in the platform.

Preferably, the radius of the driving wheel is smaller than the vertical distance between the planar surface and the seats of the longitudinal row, notably the vertical distance between the planar surface and seat bases of the longitudinal row.

Preferably, the planar surface may be transversally next to the longitudinal row.

Preferably, the longitudinal row is disposed transversally, and notably longitudinally, level with the driving wheel.

Preferably, the longitudinal row extends rearward and/or forward the wheel housing.

Preferably, the in the upper position, the upper half of the wheel is above the planar surface.

Preferably, the first wheel and the second wheel are identical, and/or the first wheel and the second wheel extend longitudinally over the majority of the length of the wheel housing.

Preferably, the second longitudinal row is disposed on the second housing.

Preferably, the electric engine is disposed in the rim and/or around the hub.

Preferably, the longitudinal row(s) of seats of the unit extend(s) along a majority of the length of the unit, possibly the longitudinal row(s) of seats of the unit extend(s) along a majority of the length of each transversal side of the unit.

Preferably, the longitudinal row is over the wheel top of the driving wheel.

Preferably, the planar surface encloses a rectangle with an area of at least the half of the area of the passenger compartment.

Preferably, the longitudinal interspaces between the seats, respectively the seat places, vary locally along the longitudinal row of at most 15 cm.

Preferably, the wheel housing comprises a wheel housing top under the longitudinal row of seat places.

Preferably, the planar surface is vertically level with the rim, and optionally vertically level with the hub.

Preferably, in the driving configuration, the rotation axis of the wheel is vertically level with the platform. This feature centres vertically the wheel on the platform, and reduces stress in the connection between the wheel and the platform. It allows a lightweight construction.

Preferably, the unit comprises a vertical area between the planar surface and the longitudinal row of seat places; the rim top being vertically level with said vertical area.

Preferably, the platform comprises a maximum height with respect to the ground, such as an altitude, of at most: 0.50 m; or 0.40 m.

The driving wheel level and its rotation axis level may be assessed out of charge, notably out of passengers. The upper position and/or the lower position may be assessed under the same condition(s).

The symmetry is a transversal symmetry, for instance with respect to a vertical and longitudinal plane.

Each top is understood as the highest point of the corresponding part.

The rim and the rim top are not essential features of the invention.

It is another aspect of the invention to provide an electric bus for at least forty passengers, notably an articulated electric bus, said electric bus including a unit with:
  a passenger compartment comprising a main floor with a planar surface extending over the majority of the width of the passenger compartment,
  a wheel housing,
  a longitudinal row of seat places on the wheel housing, and a driving wheel which is housed in the wheel housing under the longitudinal row of seat places and which includes: an electric engine with an engine top above the planar surface.

It is another aspect of the invention to provide an electric bus for at least forty passengers, notably an articulated electric bus, said electric bus including a unit with:
- a passenger compartment comprising a main floor with a planar surface extending over the majority of the width of the passenger compartment,
- a wheel housing adjacent to the planar surface,
- a longitudinal row of seat places on the wheel housing, and
- a driving wheel which is housed in the wheel housing under the longitudinal row of seat places and which includes: an electric engine, a rotation axis, said driving wheel being movable vertically with respect to the planar surface between an upper position, notably a boarding position, where the rotation axis of the wheel is above the planar surface; and a lower position, notably a driving position, wherein the rotation axis of the wheel is under the planar surface.

It is another aspect of the invention to provide an electric bus for at least forty passengers, notably an articulated electric bus, said electric bus including a unit with:
- a wheel housing,
- a passenger compartment delimited by a main floor with a planar surface extending over the majority of the width of the passenger compartment along the wheel housing and/or the whole length of said passenger compartment,
- a longitudinal row of seat places on the wheel housing, and
- a driving wheel which is housed in the wheel housing under the longitudinal row of seat places and which includes: an electric engine, a rotation axis, a rim with a rim top vertically level with the passenger compartment.

It is another aspect of the invention to provide an electric bus for at least forty passengers, notably an articulated electric bus, said electric bus including a unit with:
- a transversal direction,
- two transversally opposed wheel housings,
- a driving wheel in each wheel housing, each driving wheel including an electric engine, a rotation axis, and a transversal width,
- a passenger compartment vertically level with the driving wheels,
- a platform portion delimiting the passenger compartment between the two transversally opposed wheel housings which is vertically thinner than the transversal width of the driving wheels.

It is another aspect of the invention to provide a use of a wheel housing of an electric bus for supporting a longitudinal row of seat places above a driving wheel in said wheel housing, said electric bus including a unit with:
- the driving wheel including: an electric engine, a rotation axis, a rim with a rim top, and possibly a hub with a hub top,
- a passenger compartment comprising a main floor with a planar surface extending over the majority of the width of the passenger compartment along the wheel housing, said planar surface being below the rim top, and possibly below the hub top, preferably the wheel housing extends longitudinally along at least at least two or at least three seat places of the longitudinal row and/or the electric bus is in accordance with the invention.

Preferably, the upper main beam is a longitudinal beam and/or forms the top of the wheel housing.

Preferably, the rim comprises a rim top which is vertically between the planar surface and the upper main beam of the wheel housing.

The different aspects of the invention may be combined to each other. In addition, the preferable options of each object of the invention may be combined with the other objects of the invention, unless the contrary is explicitly mentioned.

TECHNICAL ADVANTAGES

It may be understood that the invention provides an electric bus exhibiting a thin low platform and small wheels, which are however involved in side protection. More specifically, the invention provides a specific vertical positioning of the stiff portions of a wheel with respect to the main platform receiving passengers. It will be understood that a low platform increases the compactness of an electric bus, and favours a no-step docking along a street curb stone at a bus stop. The height of the electric bus may be reduced significantly while keeping a comfortable space within the passenger compartment.

The invention essentially uses small wheels. These wheels of reduced diameter permit to reduce the height of the wheel housings, and thus to reduce volume deducted from the passenger compartment for positioning each wheel. The invention provides a compromise between safety and the capacity of the passenger compartment. Then increasing the size of the rim with respect to the wheel permits to increase the protection potential.

The rims form side shields at the level of the passenger compartment. This precaution is interesting in view of a side collision with a vehicle whose front bumper is above the planar surface of the main floor. Then, the rims form physical obstacles blocking the bumper and reducing the deformation imposed to the wheel housing.

BRIEF DESCRIPTION OF THE DRAWINGS

Several embodiments of the present invention are illustrated by way of figures, which do not limit the scope of the invention, wherein FIG. 1 provides a schematic illustration of a side view of an electric bus in accordance with a preferred embodiment of the invention.

DETAILED DESCRIPTION OF THE INVENTION

This section describes the invention in further detail based on preferred embodiments and on the figures. Similar reference numbers will be used to describe similar or the same concepts throughout different embodiments of the invention.

It should be noted that features described for a specific embodiment described herein may be combined with the features of other embodiments unless the contrary is explicitly mentioned. Features commonly known in the art will not be explicitly mentioned for the sake of focusing on the features that are specific to the invention. For example, the electric bus in accordance with the invention is evidently equipped with a computer, even though such computer is not explicitly referenced on the figures nor referenced in the description.

The dimensions may be measured free of passengers, and/or on a horizontal planar ground.

In the following description, the word "longitudinal" may correspond to the main elongation of the electric bus, and/or to the main driving direction of the electric bus. It may correspond to a central direction that extends along all the units of the electric bus. The lengths may be measured longitudinally. The transversal direction is perpendicular to the longitudinal direction of the electric bus. The word "inner" and "outer" are considered transversally. The word "outer" is directed toward the electric bus environment.

Figure 1:
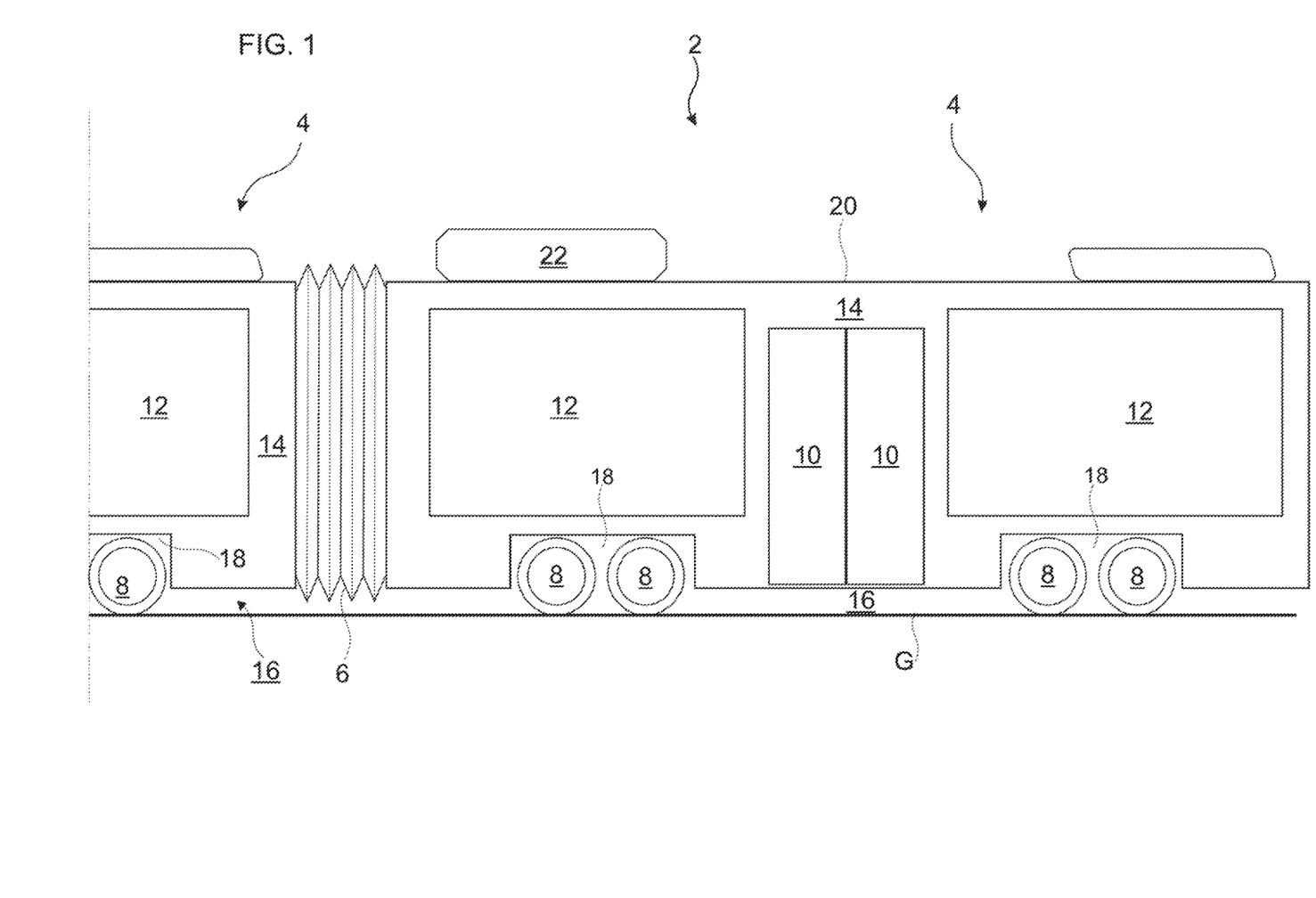

FIG. 1 shows a vehicle for mass transportation. The vehicle is adapted for transportation of passengers in cities and may transport about one hundred passengers, for instance one hundred and twenty passengers. The vehicle may be a bus, notably an electric bus 2. An electric bus 2 is understood as a bus using electric power for its driving engine(s), preferably exclusively electric energy. Hence, the electric bus 2 may be free of combustion engine.

The electric bus 2 may be an articulated bus. It may comprise a first unit 4 and a second unit 4 (partially represented). Each unit 4 may form a body, and/or may form a rigid element. Each unit 4 may be a trailer and/or a tractor. Each unit 4 may be self-supporting. These units 4 may be joined by a connection, for instance a hinged connection 6 enabling the units 4 to swivel with respect to each other. In the current illustrative example, only two units 4 are represented, however it is contemplated in the current invention that the electric bus 2 includes three, four, or more units 4, which are articulated with respect to other by hinged connection 6. Then, the passenger capacity may be more than two hundred.

An electric bus formed of a single unit is also considered.

Each unit 4 may include one or several axles. Each axle includes wheels engaging the ground G.

Each wheel may be a driving wheel 8. Thus, the driving capacity of the electric by may be increased. At least one or each wheel 8 may be linked to the corresponding unit 4 by a suspension system (not represented in the current figure). A steering system (not represented) may be provided.

One or several or each driving wheel 8 may be dotted with an electric engine (not represented in the current figure). These electric engines permit to rotate the driving wheels 8 on themselves in order to drive, to propel, the electric bus 2. The driving wheels may have a diameter of about 70 cm. The driving wheels 8 may be identical or similar.

At least one or each unit 4 may include doors 10. The doors 10 may be arranged between side windows 12. The doors 10 provide an access for the passengers. The electric bus 2 may be adapted to passengers with wheelchairs, which means with reduced crossing capacities. Thus, the electric bus 2 may be step free.

Each unit 4 may include side walls 14, notably two side walls 14 (only one per unit is apparent).

The side walls 14 may receive the doors 10 and/or the side windows 12.

The electric bus 2 may comprise a ground clearance 16. The ground clearance 16 may be measured between the ground G and the lower structure; or between the ground G and the lowest point of the electric bus 2. The ground clearance 16 may be defined in the driving configuration, thus the ground clearance 16 may be a driving ground clearance, and may be of about 30 cm.

The side walls 14 may connect and delimit wheel housings 18. Each wheel housing 18 may receive at least one driving wheel 8, or at least two driving wheels 8 which are longitudinally offset, preferably longitudinally distant. In the wheel housing 18, the two driving wheels 8 may form a pair of driving wheels 8 which are facing each other longitudinally. These driving wheels 8 may engage the same wheel path.

The driving wheels 8 may be distributed longitudinally along the unit 4. The wheel pairs may be distributed longitudinally along the unit 4. For instance, a front pair may be centred on the front half of the corresponding unit 4, and a rear pair may be centred on the rear half of the corresponding unit 4. Thus, mechanical stress is reduced.

The vehicle 2 may exhibit a roof 20. The roof 20 may join two transversally opposite side walls 14.

The roof 20 may receive equipment, for instance an air conditioning device 22, or other devices.

The side walls 14 may define the passenger compartment between them. The passenger compartment is adapted for standing passenger, and for sitting passenger as well. For this purpose, the electric bus exhibits a seat arrangement within the passenger compartment. Handles fixed to the roof improve equilibrium of standing passengers.

Figure 2:
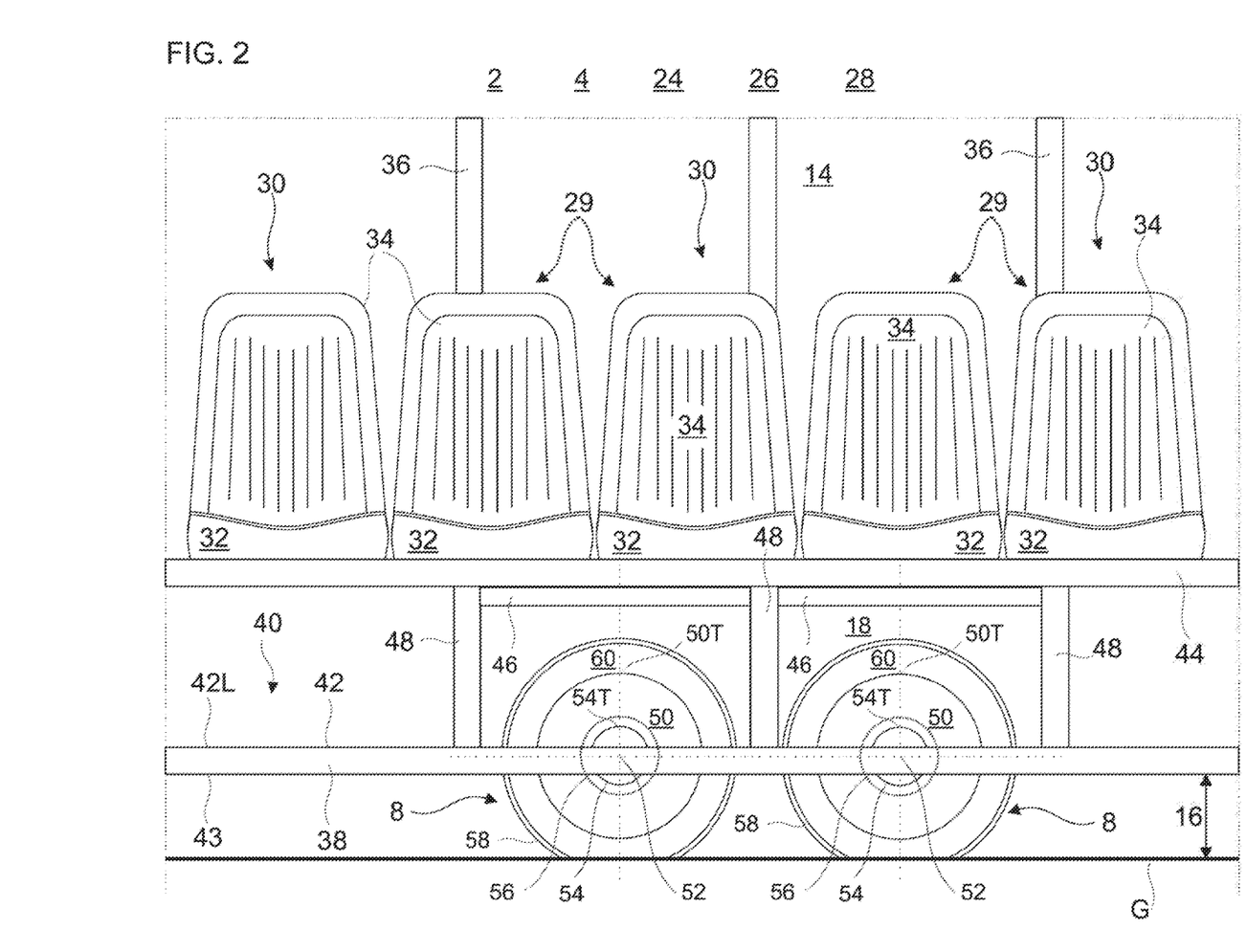
FIG. 2 provides a schematic illustration of a transversal view of an electric bus seat arrangement in accordance with a preferred embodiment of the invention.

FIG. 2 shows a portion of the structure 24 of a unit 4 of an electric bus 2. The represented portion 24 exhibits a passenger compartment 26 and a seat arrangement 28. The unit 4 as the electric bus 2 may be identical or similar to the one as described in relation with FIG. 1. FIG. 2 represents a sectional view of the structure 24 along a vertical and longitudinal plane. The current view may correspond to a driving configuration of the electric bus; wherein the ground clearance 16 is increased.

The seat arrangement 28 exhibits a longitudinal row of seat places 29. Each seat place 29 may be understood as a place for one passenger. The seat places 29 may form a longitudinal alignment.

Each seat place 29 may be formed by a separate and distinct seat 30. The seats 30 may be identical. Within the longitudinal row, the seats 30 may be placed longitudinally side by side. The front and the rear of each seat 30 may be transversally opposed. Longitudinally, the seats 30 may be regularly spaced from each other within their respective longitudinal row. The seats 30, notably the seat bases 32, may be separated by substantially identical longitudinal interspaces. Optionally, the longitudinal interspaces between seats 30 may vary locally along the longitudinal row, for instance of at most: 15 cm or 8 cm.

In the current view, five seat places 29 are represented, however any other number of seat places 29 pro row may be considered. The longitudinal row may comprise: two, or three, or four or six seat places 29; or even more.

Each seat 30 may include a seat base 32. The seat bases 32 may be horizontal. Each seat 30 may include a backrest 34. The backrests 34 may be coplanar. The backrests 34 may rely on the side wall 14. Some backrests 34 may be in contact of vertical posts 36 of the side wall 14. Within the longitudinal row, the seat places 29, and respectively their seat bases 32 may be at the same vertical level.

Two driving wheel 8 are represented in their wheel housing 18. The wheel housing 18 forms a cage which encloses at least the half of the height of each driving wheel 8. Thus, the wheel housing 18 may protect each wheel 8. The wheel housing 18 may extend to the platform 38 of the structure 24. The platform 38 may be part of the under structure of the electric bus 2. The platform 38 may be a low platform, notably because it is partially level with the lower half of the driving wheels 8. Its altitude may be less than 40 cm. Besides, the driving wheels 8 are represented in the background of the platform 38. The platform 38 may form the main floor 40 of the passenger compartment 26. The main floor 40 may be essentially flat, for instance step free. It may include a planar surface 42. The platform 38 may also exhibit a bottom surface 43, notably facing the ground G. The vertical thickness of the platform 38 may be measured from the planar surface 42 to the bottom surface 43.

The planar surface 42 may span along the whole length of the passenger compartment 26, notably of the unit 4. The planar surface 42 may extend over the majority of the passenger compartment 26 width along the whole length of the passenger compartment. Thus, the planar surface 42 may enclose a rectangular surface with a length equal to the length of the passenger compartment 26, and a width representing at least the half of the width of said the passenger compartment 26. Since the electric bus 2 may be symmetrical, the planar surface 42 may spread transversally from the wheel housing 18 to a second transversally opposed and transversally symmetrical wheel housing (not represented). The planar aspect of the main floor 40 assures that a wheelchair has access to the whole passenger compartment, which becomes compulsory for mass public transportation vehicles. The wheel housing 18 may be formed by at least one main beam 44, optionally several main beams 44 which notably extend longitudinally. The at least one main beam 44 may comprise a lower main beam also forming the platform 38, and/or an upper main beam 44. The upper main beam 44 may extend, at least, along the whole length of the longitudinal row. The seats 30, notably through their seat bases 32, may be in contact and/or fixed to the upper main beam 44. The at least one main beam 44 may be above the driving wheels 8. It may form a bridge over the driving wheels 8.

In addition, the wheel housing 18 may be strengthened by at least one reinforcement beam 46, optionally by several reinforcement beams 46. The reinforcement beams 46 may substantially extend along the whole length of the wheel housing 18. The wheel housing 18 may extend along the whole length of the respective reinforcement beams 46. The latter may be used to compensate the discontinuity appearing in the structure 24 due to the driving wheels 8 and to the wheel housing 18. Indeed, the wheel housing may form a notch in the platform 38.

Vertical bars 48 may delimit the wheel housing 18. One of the vertical bars 48 may be disposed longitudinally between the driving wheels 8. The vertical bars 48 may be fixed to the main beams 44, and possibly to the reinforcement beams 46.

At least one or each driving wheel 8 may comprise a rim 50 about the rotation axis 52. Each rim 50 may be fixed to an associated hub 54. Each driving wheel 8 may comprise an electric engine 56 for instance fixed to the corresponding hub 54, and notably around it. Each electric engine 56 may be encircled by the associated rim 50. In the current configuration, the rotation axis 52 of at least one or of each driving wheel 8 is arranged between the planar surface 42 and the bottom surface 43, thus within the vertical thickness of the platform 38.

The bus 2 may comprise a vertical area between the planar surface 42 and the longitudinal row of seat places 29. The vertical area may be vertically between the main beams 44 and the main floor 40. The vertical height of said vertical area may correspond to the height of the vertical bar(s) 48.

The rim top 50T may be vertically level with said vertical area. It may be between the seat places 29 and the main floor 40.

Each rim 50 comprise a rim top 50T. At least one or each rim top 50T may be in elevation with respect to the planar surface 42. Thus, the rim top 50T may reach the passenger compartment 26 level, and may form a side barrier. A majority of the upper half of each rim 50 may be above the planar surface 42. Therefore, the rim 50 is in a protecting position since its height sticks out the main floor 40.

Each rim 50 may be formed of a stiff material, notably metal. It may be stiffer than the tire 58 it receives. Thus, the radial height, or radial width of the tire flange 60 of the tire 58 may be reduced. For instance, the radial height of the tire flange 60 may be smaller than the half of the transversal width of the tire 58, and consequently smaller than 50% of the transversal width of the wheel 8. The radial height of the tire flange 60 may be measured between the rim 50 and the tread, notably perpendicularly to the rotation axis 52. For illustrative purposes, the transversal width of the wheel 8 may range from 250 mm to 300 mm.

In order to increase further the side protection, the hub top 54T of at least one or each hub 54 may be at a higher location than the main floor 40 of the planar surface 42. The planar surface 42 may define a main level 42L which is below the rim top 50T and possibly the hub top 54T. The main level 42L may be the lower and/or the average level of the main floor 42. The main floor 42 may exhibit a single level, notably all along the longitudinal row(s), and/or along the whole passenger compartment 26.

For the sake of compactness, the seats 30 of the longitudinal row may be disposed over the driving wheels 8. Consequently, the driving wheels 8 may be disposed under the seats 8. Thus, the seats 8 may indirectly cover the driving wheels 8. The seats 30 may be fixed to the wheel housing 18. Their seat bases 32 may be received thereon. At least two seats 30 may be totally within the longitudinal limits of the wheel housing 18. At least three or four seats 30 may cover the wheel housing 18, for instance by means of theirs seat bases 32. The longitudinal row may continue longitudinally away from the wheel housing 18.

Alternatively or in addition, at least one or several longitudinal rows of seat places 29 may form one or several longitudinal benches, said benches being parallel and possibly colinear.

At least one or each driving wheel 8 may be vertically mobile with respect to the platform 38, for instance between an upper position (currently represented), and a lower position (as represented in the following figure). These positions or configurations may correspond respectively to a reduced position and a raised position of the platform 38 with respect to the ground G.

Figure 3:
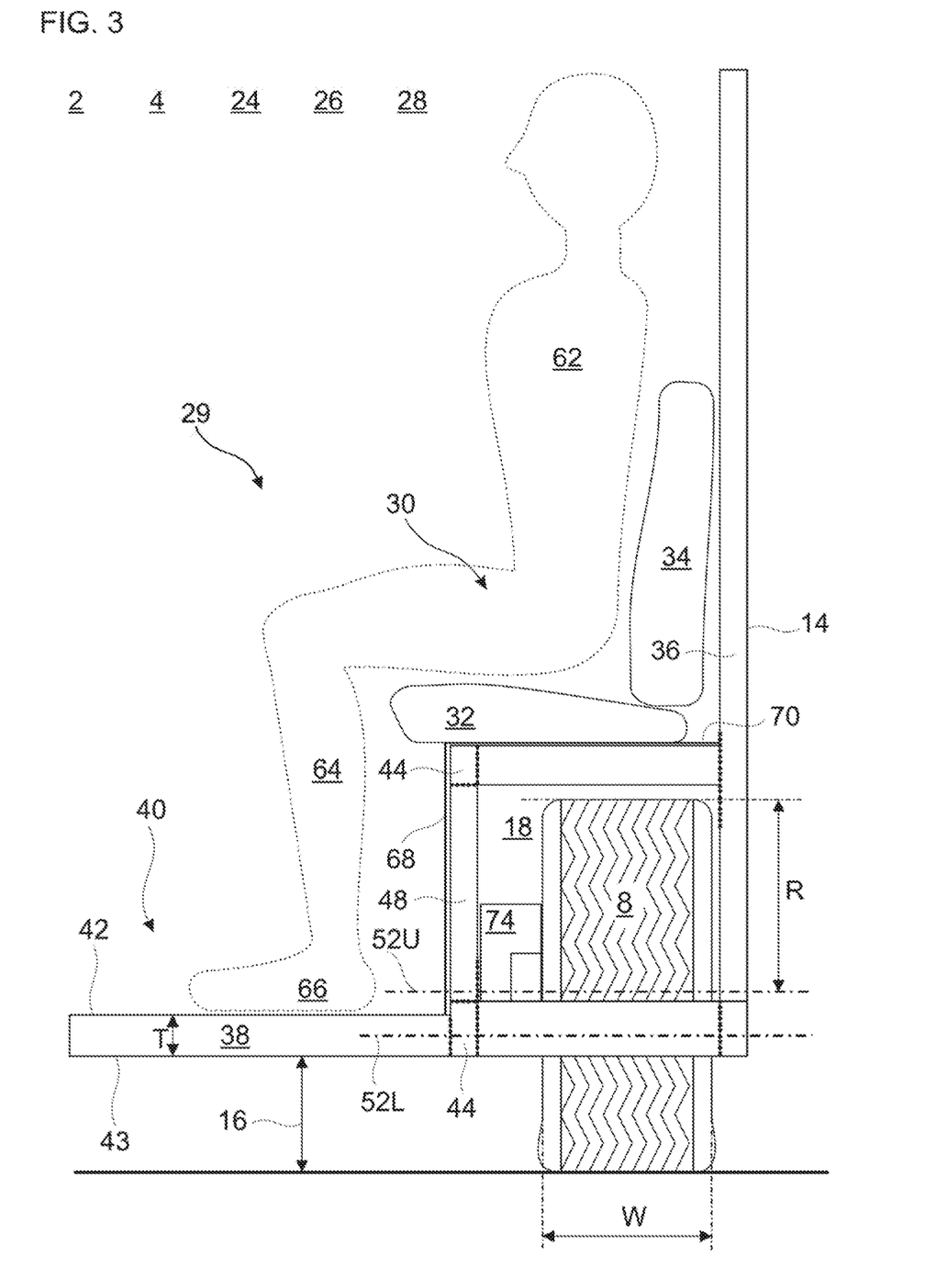
FIG. 3 provides a schematic illustration of a longitudinal view of an electric bus seat arrangement in accordance with a preferred embodiment of the invention.

FIG. 3 provides a schematic illustration of a seat arrangement 28. The seat arrangement 28 may be similar to the one as described in the preceding figure(s). The current illustration may be a longitudinal view of the seat arrangement 28. Only one driving wheel 8 is represented since the other(s) may be hidden by the first one. The transversal deformation of the driving wheel 8 due to the ground contact is apparent.

In the current figure, the driving wheel 8 is actually in the upper position, and its rotation axis 52U is upside the planar surface 42. The planar surface 42 may define a main level 42L. The ground clearance 16 may be reduced or increased, notably by actuators. The rotation axis 52U is vertically at distance from the main floor 40. This position is convenient since the planar surface 42 reaches the height of a docking surface of a bus stop. There, the altitude of the planar surface may be of about 25 cm.

Then the rotation axis 52U is level with the passenger compartment 26 at the longitudinal level of the wheel housing 18. For instance, the rotation axis 52U may mask a passenger 62, more precisely its legs 64, and possibly its feet 66. Physically, the upper half of the wheel 8, and notably the upper half of the rim stands over the platform 38. Thus, the protection potential over the planar surface 42 is increased. Since the passenger 62 is looking in a transversal direction, the seat place 29 is a transversal seat place.

Under certain kinds of side collisions, the wheel may move vertically with respect to the platform, notably when the colliding vehicle strikes the driving wheel 8. The impact energy may raise the driving wheel 8 which reaches a position providing a better protection. Thus, side protection may be increased; again: notably by the suspension system.

The transversal width W of the driving wheel 8 is drawn. The transversal width W is greater than the vertical thickness T of the platform 38. In addition, the ground clearance 16 may represent at least 50% of the radius R of the driving wheel 8. This may also apply to the lower position of the driving wheel 8 which is represented through its rotation axis 52L. Here, the positioning of the rotation axis 52L may correspond to the positioning with respect to the platform 38. As it become more clearly apparent, the rotation axis 52L may stand below the planar surface 42, which means that the invention is also boarding convenient. The rotation axis 52L may be between the bottom surface 43 and the planar surface 42.

The vertical thickness T of the platform 38 may be smaller than the vertical distance between the different positions of the rotation axis 52L and 52U, which imply that the platform 38 is essentially thin in view of to the vertical displacement. The platform thickness T may represent about 10% of the diameter of the driving wheel 8, or at most 15% of the diameter of the driving wheel. The thickness T may be comprised between 5 cm and 10 cm, values included.

The seat place 29, and notably the seat 30 of the longitudinal row extends transversally over the whole transversal width W of the driving wheel 8, and/or of the wheel housing. The seat base 32 may mask the driving wheel 8. The wheel housing 18 may be considered as compact.

The wheel housing 18 may comprise a vertical plate 68 and/or a horizontal plate 70. These plates (68; 70) permit to separate the passenger compartment 26 from the inner space of the wheel housing 18. The seat base 32 may contact the horizontal plate 70. The vertical plate 68 may extend downward from the seat 30 to the planar surface 42.

The backrest 34 may be substantially parallel to the side wall 14 which also forms the wheel housing 18. The backrest 34 may be fixed to the vertical post 36. The latter may be parallel with the vertical bar 48.

The wheel housing 18 may be formed by at least one main beam 44 extending longitudinally and horizontally, preferably several main beams 44, for instance three main beams 44. One of the main beams 44 may be a lower man beam 44 joined to the platform 38. One or two of the main beams 44 may be (an) upper main beam(s) 44 at the top of the wheel housing 18. The seats 30, notably through their seat bases 32, may be in contact and/or fixed to the upper main beam(s) 44. Fixation axes may engage the upper main beam, possibly through the horizontal plate 70. The upper main beam(s) 44 may be at a higher level than the wheel top of the driving wheels 8.

The electric bus 2 may include a suspension system 74 connected to the driving wheel 8, notably to the structure 24. The suspension system 74 may be below the seat 30. It may be, at least partially, vertically level the with the platform 40. The planar surface 42 may be vertically level with the suspension system 74. The latter may project vertically upside the planar surface 42. Thus, the suspension system 74 introduces additional elements between the legs 64 of the passenger 62 and a potential car bumper colliding the side wall 14.

In FIG. 3, each feature detailed with respect to a single driving wheel 8 may apply to the other driving wheel in the wheel housing 18, and may apply to each driving wheel of the electric bus 2 or of the unit 4.

Figure 4:
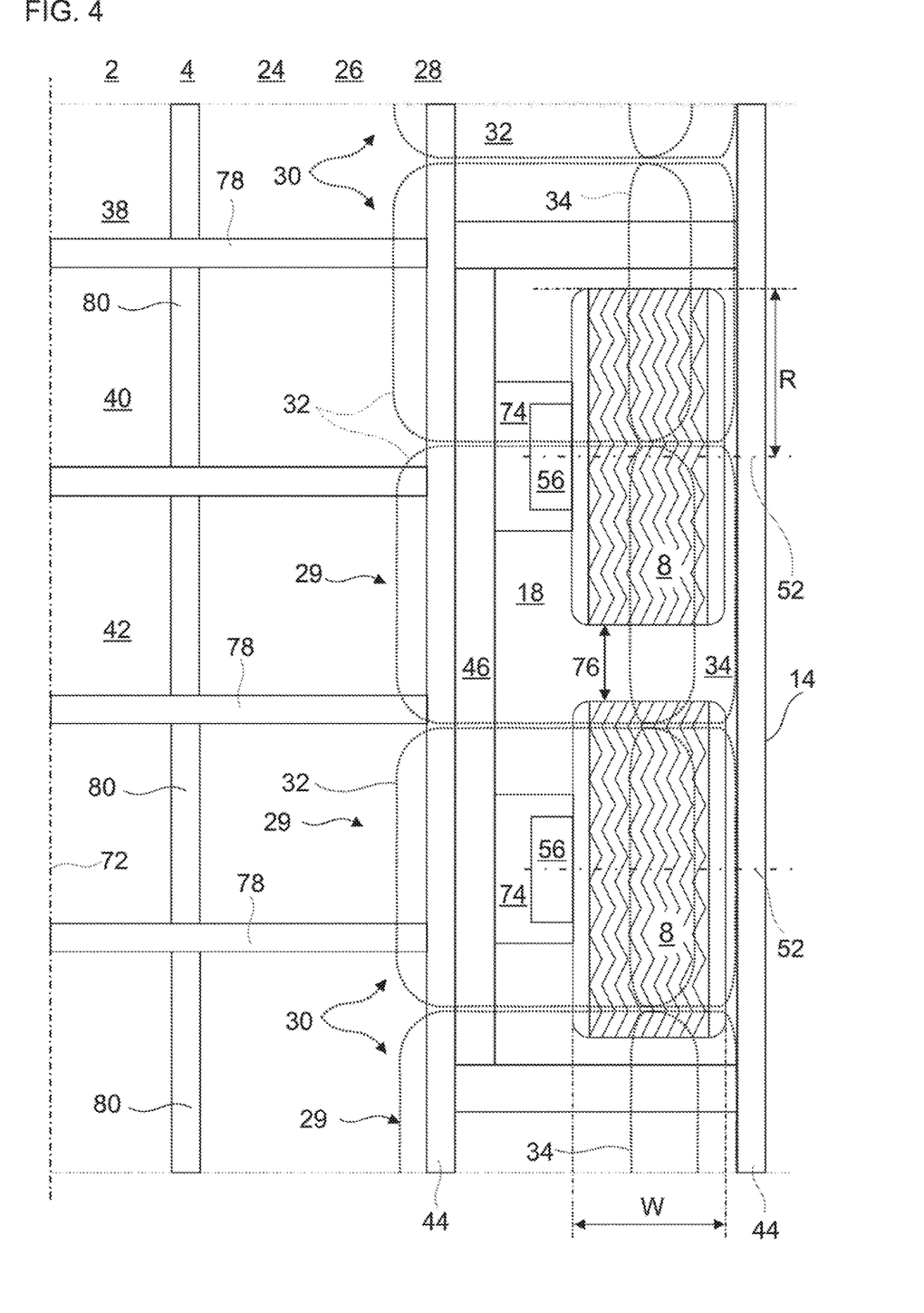
FIG. 4 provides a schematic illustration of an aerial view of an electric bus seat arrangement in accordance with a preferred embodiment of the invention.

FIG. 4 provides a schematic illustration of a seat arrangement 28. The seat arrangement 28 may be similar to the ones as described in the preceding figures. The current illustration is a top view of the seat arrangement 28 of the passenger compartment 26. The rotation axis 52 may be, in the current view, representative of the transversal direction. The vertical posts are not represented for the sake of clarity.

The electric bus 2 includes a longitudinal central axis 72. The central axis 72 may be disposed transversally in the middle of the unit 4. The seat places 29 may form an alignment parallel to the longitudinal central axis 72. The seat bases 32 may form an alignment, and the backrests 34 another one. The backrests 34 of the seats 30 may face transversally the longitudinal central axis 72. Their vertical surface receiving a passenger back may face the longitudinal central axis 72.

Each driving wheel 8 may be articulated with respect to the platform 38 by means of one of the suspension systems 74. The suspension systems 74 may be independent from each other, and notably each dedicated to one of the driving wheels 8. The longitudinal row of seat places 29 may be over at least one, or each of the suspension systems 74. The electric engines 56 may also be under the seats 30 and may, in turn, be covered by the seat bases 32. The electric engines 56 may be partially within the rims, and may protrude outside the corresponding driving wheel 8.

The longitudinal row, notably by means of its seats 30, may extend over the whole width and the whole longitudinal length of the driving wheels 8, notably the whole length of the alignment formed by the latter. The wheel housing 18 may support totally two seats 30, and may support partially at least two other seats 30.

The main beams 44, notably the upper main beams 44 may define the outline of the wheel housing 18. The driving wheels 8 may extend transversally and/or longitudinally over a majority of the inner space of the wheel housing 18, for instance defined between the upper main beams 44. The reinforcement beams 46 may comprise an upper reinforcement beam 46. The upper reinforcement beam 46 may be disposed between the upper main beams 44, and may contact the inner one. The upper reinforcement beam 46 may be under the seat places 29. It may form a reinforcement providing stiffness to the wheel housing, and thus to the structure 24 of the electric bus 2. It may also provide safety since it also forms a blocking element with regard to side impacts. It introduces another safety element between the side wall 14 and the legs of a seated passenger, or the legs of a standing passenger beside the wheel housing 18. Still during a side impact, the upper reinforcement beam 46 may reduce the deformation of the wheel housing 18, and may also absorb energy.

A longitudinal gap 76 may separate the driving wheels 8 which are located in the wheel housing 18. The longitudinal gap 76 may be smaller than the radius R of the driving wheels 8 or of one of the driving wheels 8, for instance at least two times smaller. The radius R may be measured on the rotation axis 52. The transversal width W of one of the driving wheels 8 may be greater than the longitudinal gap 76, for instance at least two times greater than the longitudinal gap 76. The reduced distance between these adjacent driving wheels 8 blocks more efficiently a salient entity striking the side wall 14. For instance, the corner of a vehicle colliding the side wall 14 between the two wheels would be blocked faster. The same also applies with regard to a side collision with a motorbike. Then, the couple of close driving wheels 8 creates a synergy.

The passenger compartment 26 may be symmetric. The seat arrangement 28 may be symmetric. The wheel housing arrangement may be symmetric. It/they may be symmetric with respect to a vertical plane, for instance passing through the longitudinal central axis 72. Thus, the first longitudinal row of seat places 29 which is currently represented may be associated with a symmetric one, namely a second longitudinal row of seat places 29. Each seat 30 may be associated with a transversally symmetric seat. These two longitudinal rows may exhibit seats 30 at the same vertical level.

For instance, the wheel housing 18 may be associated with a transversally symmetric one, which would be transversally opposed. Each of the symmetric longitudinal rows may be on the top of wheel housings, said wheel housing being also symmetric.

The passenger compartment 26 may also include a third longitudinal row (not represented) of seat places 29. This third longitudinal row may be rearward or forward the first longitudinal row. It may be collinear, and notably arranged on another rearward or forward wheel housing as it may be deduced from FIG. 1. The same may apply to a fourth longitudinal row aligned with the second longitudinal row. The first to fourth longitudinal rows may be disposed in a same unit 4, and may exhibit a same seating level, and/or a same seat place number. Accordingly, the unit 4 may include at least twenty, or at least twenty-four seat places 29.

The platform 38 may be formed of interconnected transversal beams 78 and longitudinal beams 80. They form and support the planar surface 42 of the main floor 40. As apparent, longitudinally level with the wheel housing 18 and/or with the longitudinal row of seat places 29, the planar surface 42 may extend transversally over at least 50% of the transversal width of the passenger compartment 26. All along the wheel housing 18 and/or the longitudinal row of seat places 29, the planar surface 42 may span transversally over at least 50% of the transversal width of the passenger compartment 26. This technical requirement implies that the wheel housings 18 use less than the half of the width of the passenger compartment 26. An advantage is that the passenger capacity may be increase, notably the standing passenger capacity. In addition, two wheelchairs may cross longitudinally within the passenger compartment, all along the longitudinal rows. The same possibility is offered to strollers as well.

At least one of the longitudinal beams 80 may form a portion of the platform 38 that extends transversally from the wheel housing 18 to the transversally opposed wheel housing.

In each embodiment, the features related to the planar surface may apply to the main level.

In each embodiment, the described beams, bars, and posts of the electric bus may be formed of aluminium or other alloys. Polymer composite materials enriched with carbon fibres are considered too in order to reduce the overall weight. The skilled in the art may also consider increasing the impact energy absorption of materials.

The embodiments of FIGS. 2 to 4 may be isolated from one another. It is also considered to combine the teachings of FIGS. 2 to 4, and optionally with the teaching of FIG. 1.

In FIGS. 2 to 4, only a portion of electric bus is represented. The whole bus may be obtained by one or two symmetries.

It should be understood that the detailed description of specific preferred embodiments is given by way of illustration only, since various changes and modifications within the scope of the invention will be apparent to the person skilled in the art. The scope of protection is defined by the following set of claims.

The invention claimed is:

1. An electric bus for at least forty passengers, said electric bus comprising:
  a unit including
    a wheel housing, and
    a passenger compartment, the passenger compartment defining a width and including
      a main floor with a planar surface extending over at least one half of the width of the passenger compartment along the wheel housing,
    a longitudinal row of seat places disposed on the wheel housing,
    a driving wheel which is housed in the wheel housing under the longitudinal row of seat places, the driving wheel defining a rotation axis and including
      an electric engine, and
      a rim with a rim top which is above the planar surface of the main floor, wherein the driving wheel is a first wheel, and
    a second wheel which is longitudinally spaced from the first wheel and is housed in said wheel housing under the longitudinal row of seat places, wherein a longitudinal gap between the first wheel and the second wheel is less than a transversal width of the first wheel.

2. The electric bus according to claim 1, wherein the driving wheel includes a hub fixed to the rim, said hub including a hub top above the planar surface, and the unit includes a vertical area between the planar surface and the longitudinal row of seat places, and wherein the rim top is vertically level with said vertical area.

3. The electric bus according to claim 1, wherein the driving wheel is vertically movable with respect to the planar surface between an upper position in which the rotation axis of the driving wheel is above the planar surface, and a lower position in which the rotation axis of the driving wheel is under the planar surface and vertically level with a platform.

4. The electric bus according to claim 3, wherein the main floor is formed by the platform which includes a bottom surface, the rotation axis being above said bottom surface in the lower position and in the upper position.

5. The electric bus according to claim 1, wherein the main floor is formed by a platform with a vertical thickness that is less than a width of the driving wheel, and wherein said platform defines a maximum height with respect to the ground that is less than or equal to 0.5 meters.

6. The electric bus according to claim 1, wherein the driving wheel includes a tire with a side flange defining a radial height that is less than or equal to one half of a transversal width of the driving wheel.

7. The electric bus according to claim 1, wherein the seat places of the longitudinal row transversally projects over a whole transversal width of the driving wheel, and a whole transversal width of the wheel housing.

8. The electric bus according to claim 1, wherein the wheel housing longitudinally projects along at least two seat places of the longitudinal row.

9. The electric bus according to claim 1, wherein the electric bus defines a longitudinal central axis, and wherein the seat places include backrests transversally facing said longitudinal central axis.

10. The electric bus according to claim 1, wherein the longitudinal row of seat places is a longitudinal bench, and the longitudinal row includes at least four adjacent seat places.

11. The electric bus according to claim 1, wherein the electric bus defines a ground clearance which represent at least one half of a radius of the driving wheel, in a lower position and in an upper position.

12. The electric bus according to claim 1, wherein the longitudinal row is a first longitudinal row, the unit further including a second longitudinal row of seat places which are vertically disposed at a same level as the seat places of the first longitudinal row.

13. The electric bus according to claim 1, wherein the driving wheel includes a suspension system below the longitudinal row and vertically level with the planar surface of the main floor.

14. The electric bus according to claim 1, wherein the longitudinal row is a first longitudinal row, the unit further including a second longitudinal row of seat places which is symmetric to the first longitudinal row, the planar surface transversally extending from the first longitudinal row to the second longitudinal row on at least one half of the width of the passenger compartment.

15. The electric bus according to claim 1, wherein the unit is a first unit, the electric bus including at least a second unit that is identical to the first unit, the first unit and the second unit being joined to each other by a hinged junction, the electric bus having a passenger capacity of at least one hundred passengers with at least thirty seat places formed by the longitudinal rows.

16. An electric bus, comprising:
a wheel housing supporting a longitudinal row of seat places above a driving wheel in said wheel housing, and
a unit including
the driving wheel, the driving wheel defining a rotation axis and including an electric engine and a rim with a rim top, wherein the driving wheel is a first wheel,
a second wheel which is longitudinally spaced from the first wheel and is housed in said wheel housing under the longitudinal row of seat places, and wherein a longitudinal gap between the first wheel and the second wheel is less than a transversal width of the first wheel, and
a passenger compartment defining a transversal width of the passenger compartment and including a main floor with a planar surface extending over at least one half of the transversal width of the passenger compartment along the wheel housing, said planar surface being below the rim top, and the wheel housing longitudinally extending along at least two seat places of the longitudinal row.

17. An electric bus for at least forty passengers, said electric bus comprising:
a unit that includes
a wheel housing with an upper beam,
a passenger compartment that defines a width and includes a main floor with a planar surface extending over at least one half of the width of the passenger compartment along the wheel housing,
a longitudinal row of seat places disposed on the wheel housing,
a driving wheel which is housed in the wheel housing under the longitudinal row of seat places, the driving wheel defining a rotation axis and including
an electric engine, and
a rim which vertically extends between the planar surface of the main floor and the upper beam of the wheel housing, wherein the driving wheel is a first wheel, and
a second wheel which is longitudinally spaced from the first wheel and is housed in said wheel housing under the longitudinal row of seat places, wherein a longitudinal gap between the first wheel and the second wheel is less than a transversal width of the first wheel.

18. The electric bus according to claim 17, wherein the wheel housing includes a main beam extending along a whole length of the longitudinal row of seat places, and a reinforcement beam, and wherein the wheel housing extends along a whole length of said reinforcement beam.

19. The electric bus according to claim 17, wherein the wheel housing is a first housing, the unit further including a second housing symmetric to the first housing, the planar surface transversally extending from the first housing to the second housing.

* * * * *